United States Patent [19]

White et al.

[11] 3,979,074
[45] Sept. 7, 1976

[54] METHOD AND APPARATUS FOR PROCESSING CROP STACKS

[75] Inventors: Allen Andrew White, Peabody; Ray Addison Adee; Ronald Henry Knopp, both of Newton, all of Kans.

[73] Assignee: Hesston Corporation, Hesston, Kans.

[22] Filed: Oct. 11, 1974

[21] Appl. No.: 514,110

[52] U.S. Cl. ............................ 241/30; 241/101 A; 241/101.5; 241/101.7; 241/186 R; 214/78; 214/131 R

[51] Int. Cl.² ........................................ B02C 21/02

[58] Field of Search ............... 241/30, 101 A, 101.5, 241/101.7, 186 R, 186.2, 186.4, 189 R, 191, 197, 222, 223, 229, 237, 239, 241; 214/130 R, 131 R, 140, 144, 332, 390, 652, 654, 78; 56/16.1, 397

[56] References Cited
UNITED STATES PATENTS

| | | | |
|---|---|---|---|
| 2,087,628 | 4/1963 | Jester | 214/130 X |
| 2,267,237 | 12/1941 | Heimark | 56/16.1 |
| 2,606,417 | 8/1952 | Richey | 214/131 X |
| 3,406,848 | 10/1968 | Zink | 214/78 |
| 3,841,504 | 10/1974 | Spasaik | 214/78 |
| 3,863,850 | 2/1975 | Freeman | 241/101.7 |

*Primary Examiner*—Granville Y. Custer, Jr.
*Attorney, Agent, or Firm*—Schmidt, Johnson, Hovey & Williams

[57] ABSTRACT

A machine particularly suited for the range or bunk feeding of animal foodstuffs in stacks, large bales, or groups of smaller bales is designed to disintegrate the mass of material on the move and to discharge the disintegrated material in a continuous stream along the ground or into the feed bunk. A vertically swingable lift on the machine picks up the mass and swings it into a raised position wherein the mass is tightly clamped against a deactivated bank of shredding rolls and is maintained protectively cradled in such position for transport to a feeding site. Actuation of the shredding rolls and continued swinging of the lift forces the mass into the rolls to completely disintegrate the mass while the machine is advanced. The bank of shredding rolls is inclined away from the lift such as to facilitate disintegration and discharge of even the last remnant of the mass and to enhance the cradling action provided for the mass during transport and disintegration.

29 Claims, 12 Drawing Figures

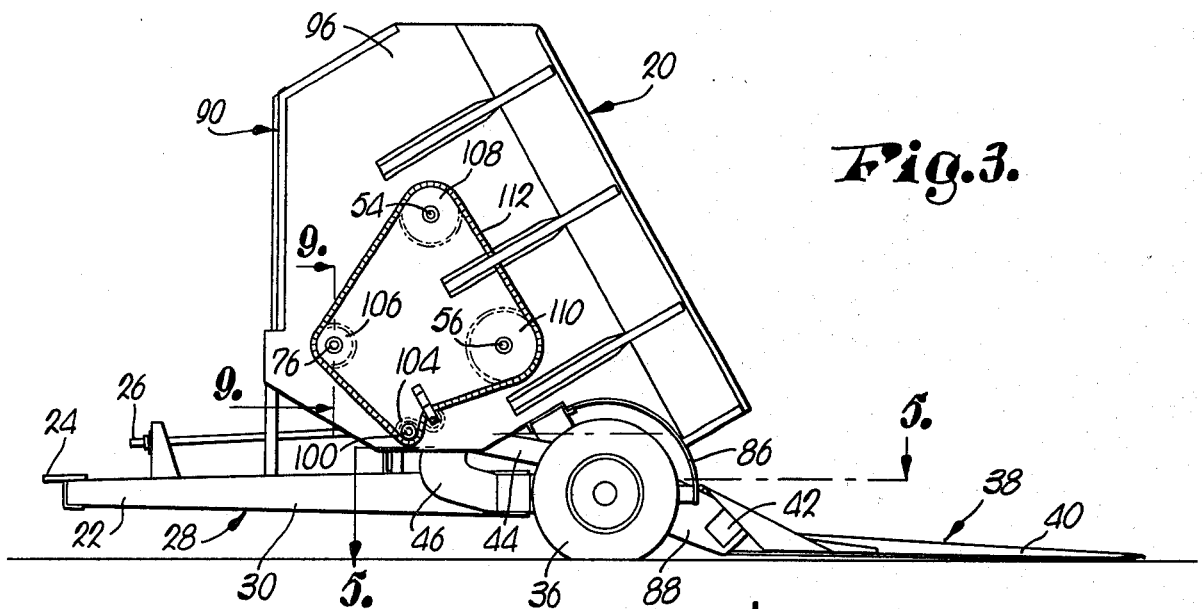
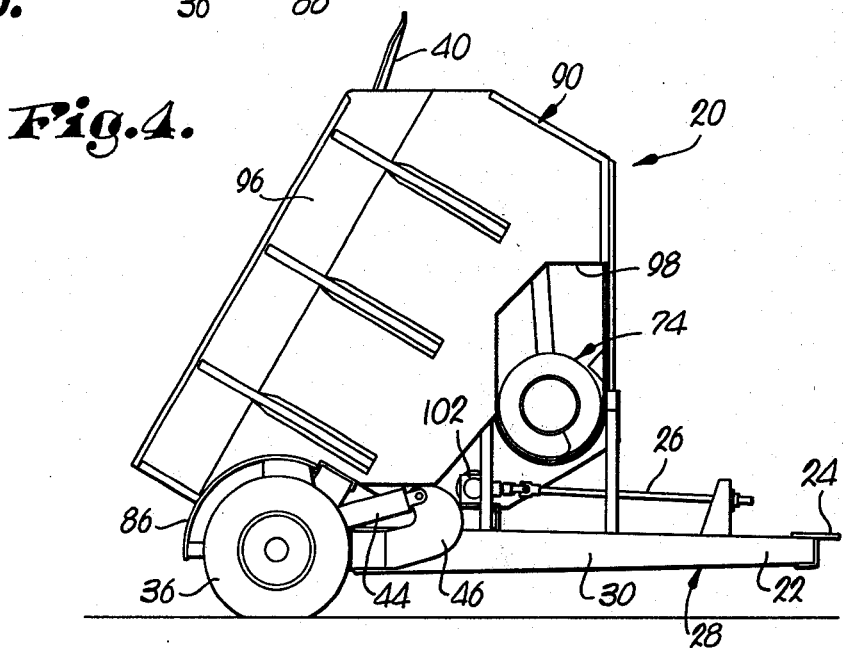
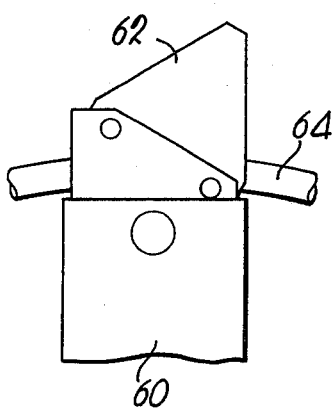
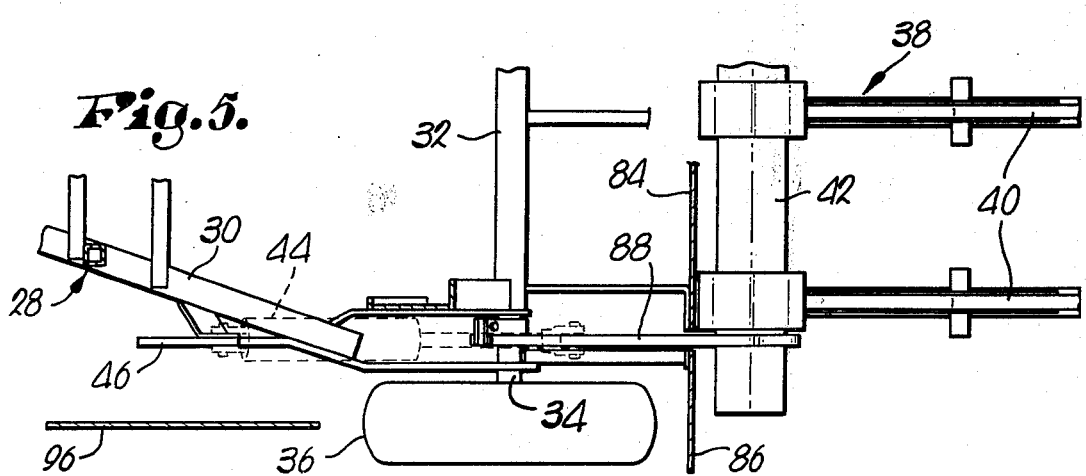

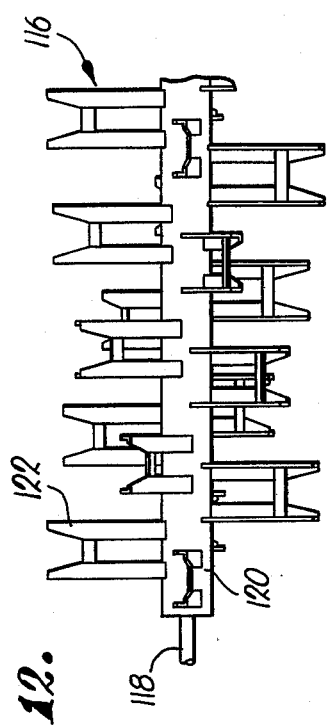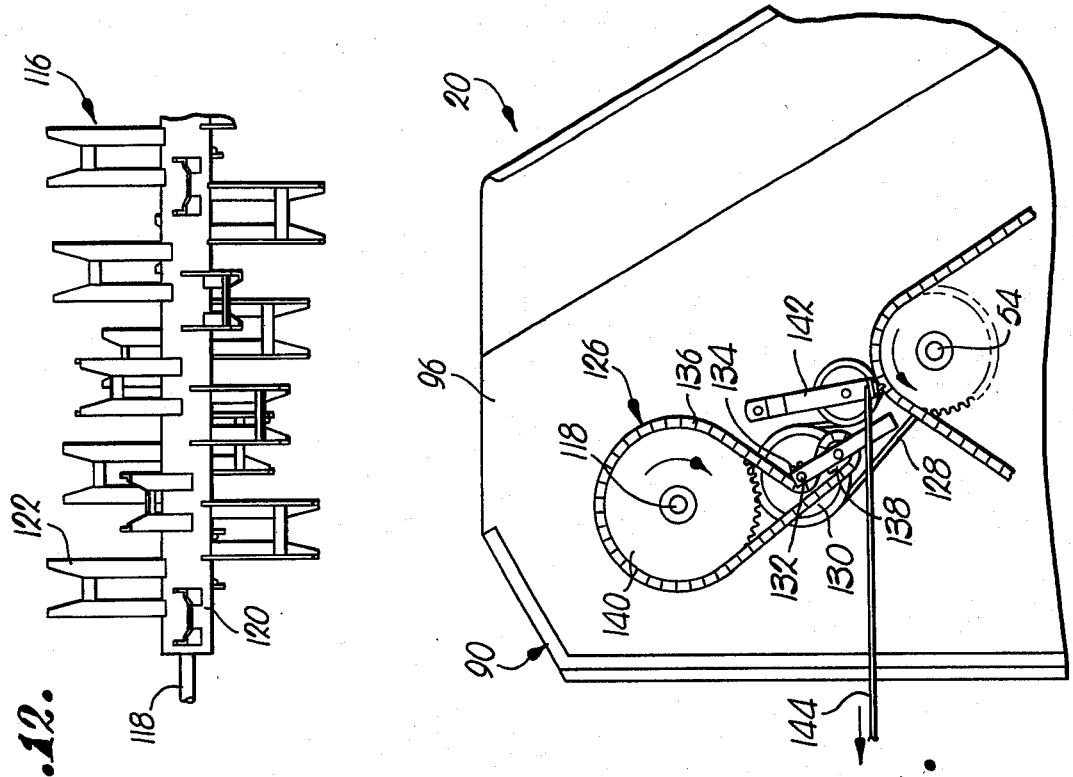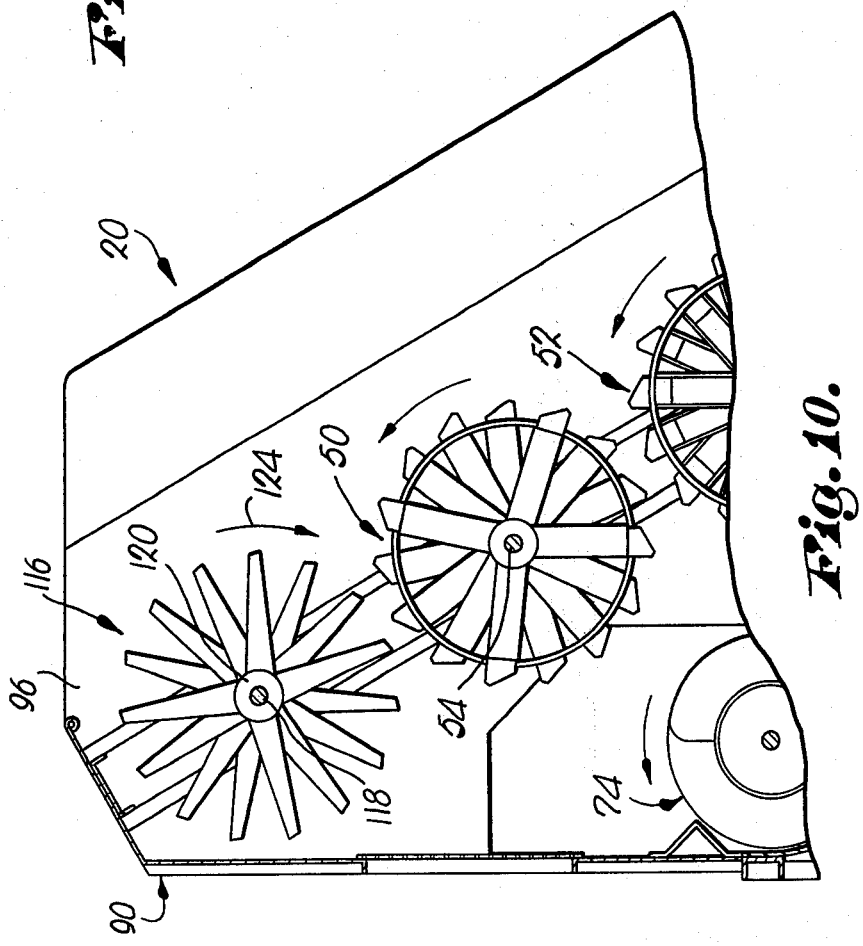

METHOD AND APPARATUS FOR PROCESSING CROP STACKS

This invention relates to the feeding of animal foodstuffs in a highly efficient and automated manner from a stack, large bale, or collection of smaller bales of the foodstuffs. More particularly, it relates to a method and apparatus for taking the foodstuffs in a relatively large, dense mass created for ease of transport and storage, and converting the mass into a disintegrated form that can be issued to livestock in a highly controlled manner in accordance with the best principles of livestock feeding.

One important object of the present invention is to provide a machine for livestock feeding which is capable of receiving foodstuffs in a variety of known forms, e.g., dense stack, large cylindrical bale, or smaller man-sized bales, and converting such stacks or bales into a fully disintegrated form for controlled distribution to livestock.

Another important object of this invention is to enable one man to feed a large number of livestock within a relatively short span of time and without backbreaking labor.

A further important object of this invention is to enable the operator to pick up a mass of foodstuffs at one location and transport the stack to a feeding site which might be a substantial distance away, all without accidental loss or destruction of the stack.

In accordance with the foregoing object an important provision of this invention is to tightly clamp the mass in a cradled condition during transport such that the chances of accidental escape of the mass are minimized.

Another important object of this invention is to facilitate the movement of stacks and the like over substantial distances by providing for cradling of the stack with its center of gravity substantially centered above the ground-engaging wheels of the machine such that the weight of the stack is distributed in the most advantageous manner for transport.

A further important object of the invention is to provide for relatively rapid, steady disintegration of a mass of foodstuffs without excessive choking and clogging up of the disintegrating structure. In this respect, an important provision is an inherent metering capability of the disintegrating structure coupled with the ability of the operator to easily regulate the speed and force at which the mass is being introduced to the disintegrating structure.

Yet another important object of this invention is to accomplish complete disintegration and feeding of the entire mass of foodstuffs, even the last remnants thereof, without requiring the operator to leave the safety and comfort of his operating station to manually feed the final portions of the mass into the disintegrating structure.

Other important objects of the invention include providing a machine meeting the foregoing objectives which is compact in design, useful in moving stacks and the like short distances such as from one position in a storage lot to another, readily hookable to and capable of deriving its operating power from conventional farm tractors, and adapted for ready handling of all types of animal foodstuffs in various conditions of moisture and density.

In the drawings:

FIG. 3 is a side elevational view of the machine on a reduced scale showing the lift fully lowered;

FIG. 4 is a side elevational view of the opposite side of the machine with the lift fully raised;

FIG. 5 is a fragmentary, cross-sectional view through the machine taken substantially along line 5—5 of FIG. 3;

FIG. 6 is an enlarged, fragmentary detail view of a blade mount utilized in the shredding structure of the machine;

FIG. 10 is a fragmentary view of the machine similar to FIG. 1 but showing an alternate form of metering means on the shredding structure;

FIG. 11 is an enlarged, fragmentary side elevational view of the alternate embodiment in FIG. 10 showing the drive mechanism associated with the alternate metering means; and FIG. 12 is a fragmentary plan view of the metering rotor utilized in conjunction with the alternate embodiment.

Figure 1:
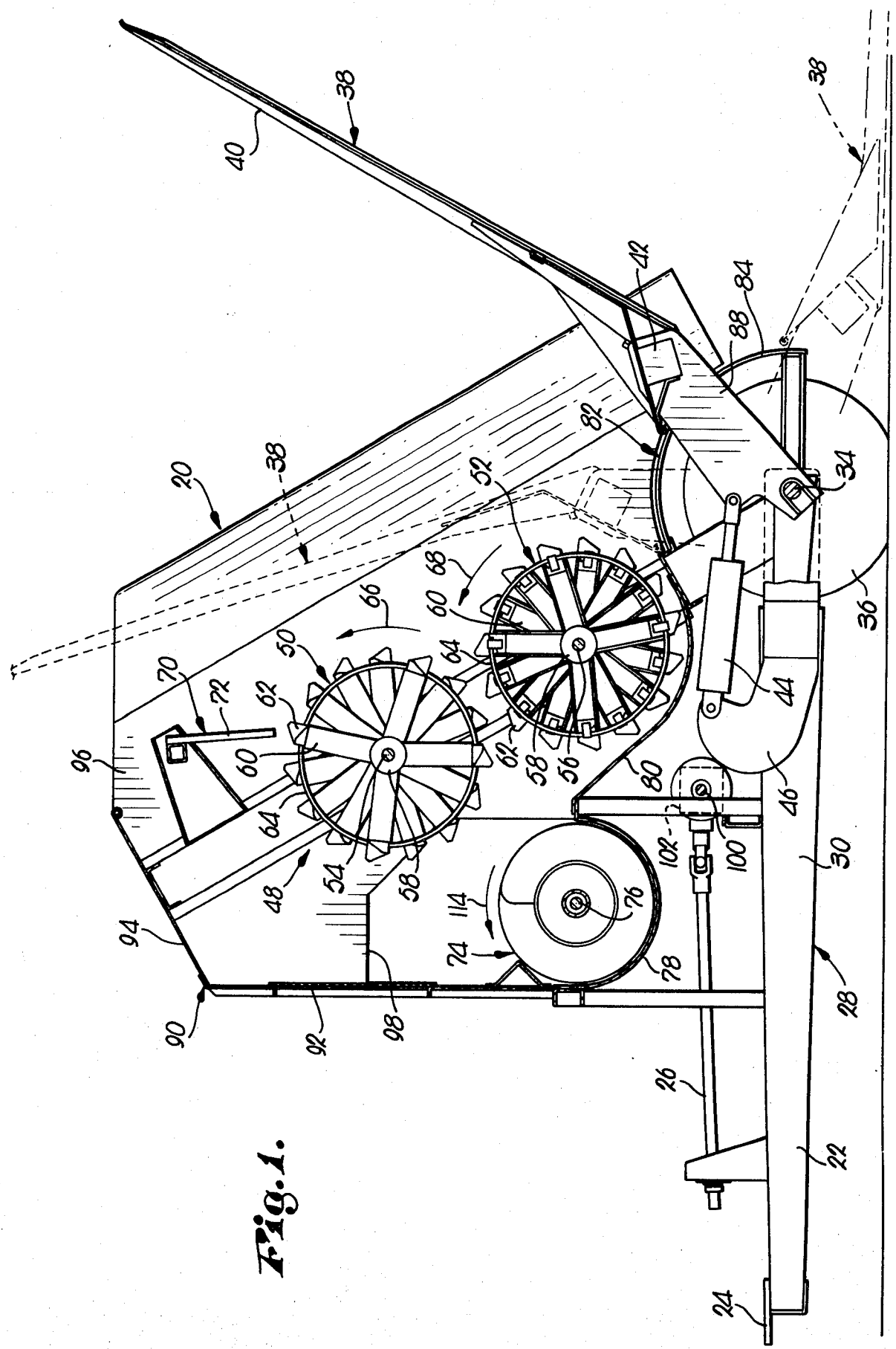
FIG. 1 is a fore-and-aft, vertical cross-sectional view through the machine of the present invention, alternate positions for the lift being illustrated in broken lines, and a portion of the machine near its rear axle being broken away to reveal details of construction.

The apparatus of the present invention is illustrated throughout the drawings as a machine 20 which, by virtue of its tongue 22, coupling 24, and forwardly extending input drive shaft 26, is especially suited for hitching to a conventional farm tractor for trailering behind the same and for utilizing its power takeoff drive mechanism. However, as will become apparent, machine 20 may be self-propelled, having its own internal power source, it may be pushed or towed while in use, or it may be maintained in a stationary condition such as for feeding into an immobile hopper. For purposes of clarity and to facilitate understanding however, the principles of the present invention will be described in conjunction with a machine of the trailering variety which derives its operating power from the towing vehicle.

The tongue 22 forms the front end of a frame 28 that is generally triangular in plan (FIG. 5 taken with FIGS. 3 and 4), having tongue 22 formed by two forwardly converging side members 30 of frame 28 and having a rear cross member 32 between members 30. An axle 34 carried by cross member 32 rotatably supports a pair of ground-engaging wheels 36 on opposite sides of frame 28 such that the latter is adapted for advancement over the ground when a draft force is applied to tongue 22.

A lift 38 having a plurality of rearwardly extending tangs 40 secured at their forwardmost ends to a common crossbeam 42 is vertically swingable about axle shaft 34 by a pair of fluid pressure piston and cylinder assemblies 44 on opposite sides of lift 38 that interconnect the latter and a pair of upturned lugs 46 on frame 28. Assemblies 44 may be supplied fluid under pressure from the towing vehicle through flow lines which are not illustrated.

The lift 38 is swingable by assemblies 44 between a lowermost, ground-paralleling position (FIGS. 1 and 3) and a raised, essentially upright position (FIGS. 1 and 4), in which latter position lift 38 is disposed closely adjacent disintegrating structure 48 including an inclined bank of shredding rolls 50 and 52. The bank of rolls 50 and 52 is inclined away from lift 38 generally to the forward side of axle 34, while lift 38 is operable primarily on the opposite side of axle 34 such that, in operation and effect, the structure 48 and lift 38 cooperate to provide a cradle for the mass of foodstuffs being handled, the structure 48 presenting one stationary leg of the cradle while the lift 38 presents an opposite swingable leg of the cradle. Note that the cradle thus presented is centered over axle 34 which is highly desirable from a weight distribution standpoint.

Figure 2:
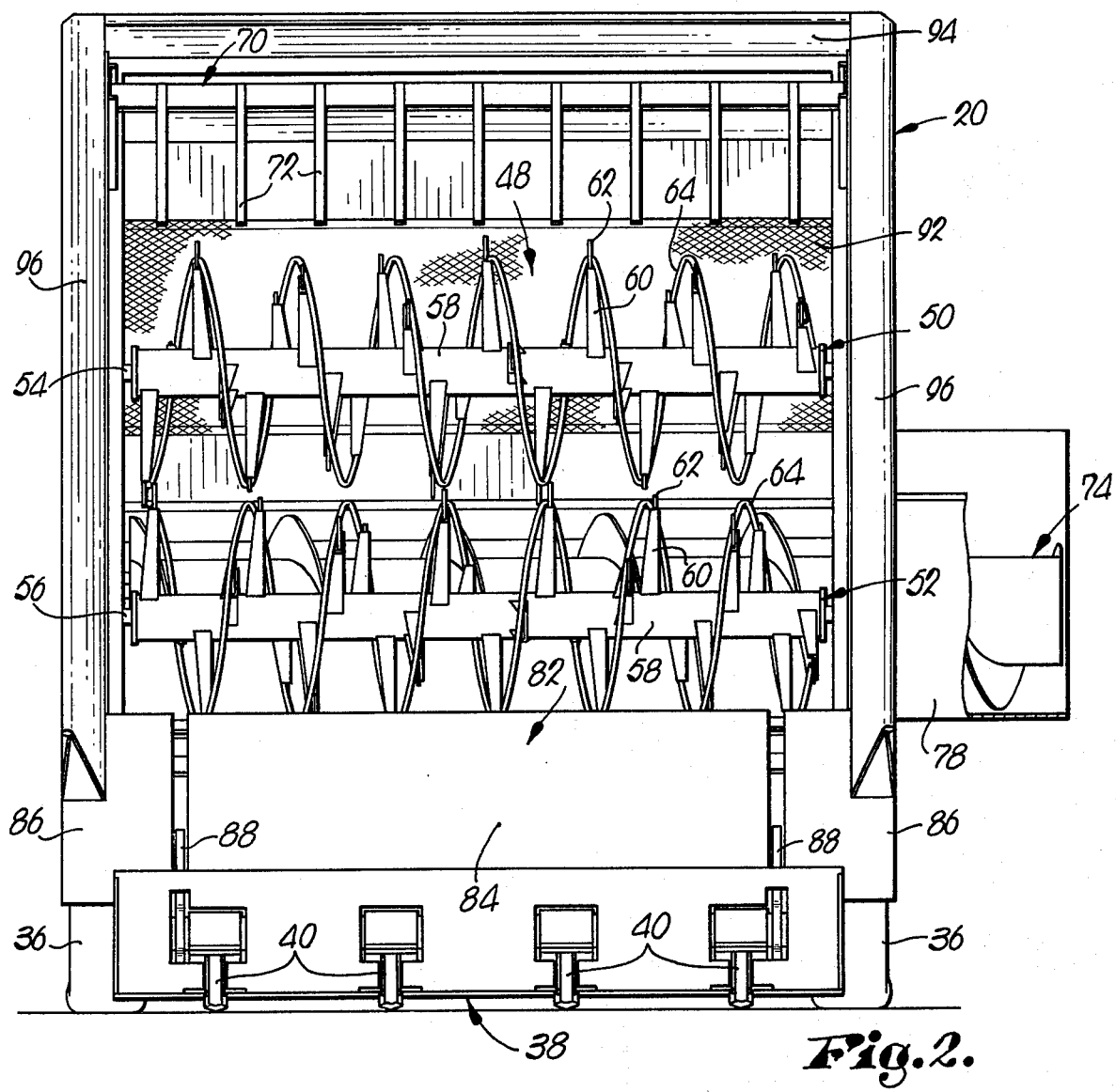
FIG. 2 is a rear elevational view of the machine with the lift in its fully lowered position.
Figure 7:
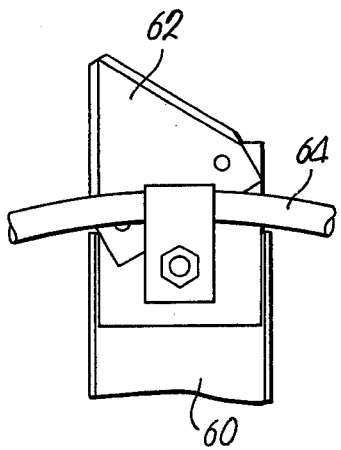
FIG. 7 is an enlarged, fragmentary, detail view of the opposite side of the mount illustrated in FIG. 6.
Figure 8:
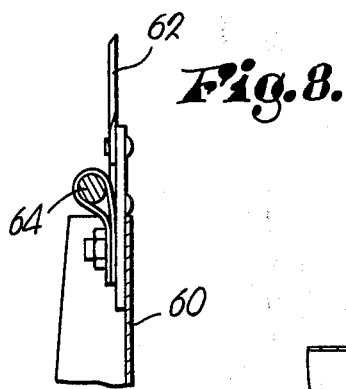
FIG. 8 is an enlarged, fragmentary edge view of the mount.
Figure 9:
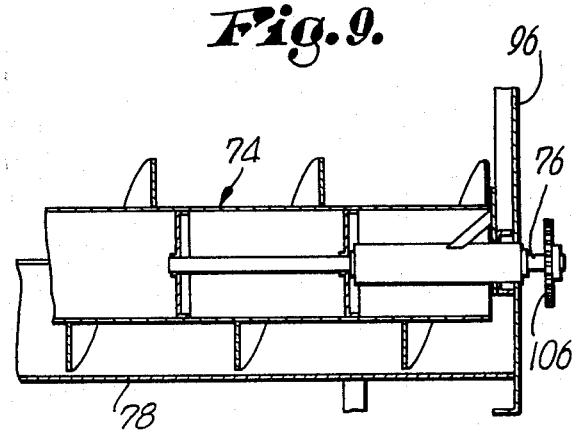
FIG. 9 is an enlarged, fragmentary, cross-sectional view through the machine taken along line 9—9 of FIG. 3.

The rolls 50 and 52 are rotatable about vertically spaced axes defined by shafts 54 and 56 respectively which extend transversely to the path of swinging travel of lift 38 for essentially the full width of the latter as illustrated best in FIG. 2. Both rolls 50 and 52 are of essentially identical construction having a central tube 58 concentrically surrounding shaft 54 or 56, a series of radially extending blade mounts 60 affixed to tube 58 in a helically extending series, a triangular cutting blade 62 mounted on the outermost end of each mount 60 respectively, and a flighting 64 of circular rod stock wound helically around and interconnecting mounts 60 in radially spaced relationship to tube 58. As illustrated in detail in FIGS. 6, 7 and 8, the blades 62 project outwardly beyond their respective flightings 64 for penetration into the mass of foodstuffs being processed and, as shown best in FIG. 1, the blades 62 on upper roll 50 are angled back away from the direction of rotation indicated by arrow 66 while the blades 62 of roll 52 are angled ahead in the direction of rotation indicated by arrow 68. A further difference between rolls 50 and 52 may be seen in FIG. 2 wherein flighting 64 of roll 50 leads in one lateral direction while flighting 64 of roll 52 leads in the opposite lateral direction.

Metering means in the nature of a tined baffle 70 is supported above rolls 50 and 52 for the full length of the latter and is provided with a plurality of spaced-apart, depending tines 72 that are spaced at their lowermost ends a short distance above the periphery of roll 50, and which are angled slightly to the rear of the shaft 54. Below the disintegrating structure 48 and forwardly thereof is disposed a laterally extending discharge auger 74 which gravitationally receives disintegrated foodstuffs from structure 48 and conveys the same to the right side of machine 20 viewing FIG. 2. Auger 74 is rotatable about a transverse axis 76 and extends outwardly beyond the right side of machine 20 as shown once again in FIG. 2. The auger 74 is provided additionally with a concave trough 78 that underlies auger 74 and cooperates with the latter in receiving and conveying the disintegrated foodstuffs.

The area directly beneath roll 52 for the full length thereof is closed by an arcuate pan or apron 80 that is complementally configured with respect to roll 52 and extends rearwardly from trough 78 to a position just beyond the rear extremity of roll 52. From that point, an upwardly arched panel 82, concentric with axle 34, extends rearwardly to a point beyond axle 34 in order to define a floor for the cradle presented by structure 48 and lift 38 for slidably supporting a mass of foodstuffs from beneath as it is forced by lift 38 toward structure 48. As illustrated in FIG. 2, the panel 82 includes a central section 84 traversing the major width of lift 38, and a pair of fender sections 86 looped above wheels 36. Sections 86 are spaced slightly laterally outwardly from central section 84 in order to provide a clearance for arms 88 of lift 38 which extend forwardly from crossbeam 42 and pivot about axle 34.

The disintegrating structure 48 and auger 74 are enclosed within a polygonal housing 90 that is open along its inclined rear end to permit swinging of lift 38 between its lowered and raised position, is provided with a foraminous screened portion 92 across its closed front to permit the operator to view the disintegrating action taking place within machine 20, is closed along its upper front portion by a solid section 94, and is closed on opposite sides by a pair of sidewalls 96. The right sidewall 96 (viewing FIG. 2) has a cutout area 98 (FIG. 4) through which the auger 74 and trough 78 project such that the disintegrated foodstuffs may be discharged outwardly beyond the trailing right wheel 36.

Driving power for auger 74 and shredding rolls 50 and 52 is provided through the input drive shaft 26 that is adapted for coupling with the power takeoff mechanism of the towing vehicle. Input shaft 26 has a right-angle connection with a cross shaft 100 within gearbox 102, and shaft 100 extends outwardly beyond left sidewall 96 in which location is disposed a small sprocket 104 (FIG. 3). Additional sprockets 106, 108 and 110 are affixed to the proximal outermost ends of shafts 76, 54 and 56 belonging to auger 74, roll 50 and roll 52 respectively. An endless drive chain 112 is entrained around all sprockets 104–110 for driving the same in response to the application of power to input shaft 26. In this respect, auger 74 is, of course, driven in the same direction as rolls 50 and 52 as indicated by the arrow 114 in FIG. 1.

OPERATION

The machine 20 may, of course, be coupled with its vehicle in either a leading or trailing relationship. For purposes of the description which follows, however, it will be assumed that machine 20 is connected to the rear of such vehicle such that the tongue 22 is disposed at the front of machine 20 and wheels 36 are located at its rear.

Hence, assuming that a mass of foodstuffs, such as a compressed, freestanding stack, is disposed on the ground in a storage lot or the like, the lift 38 is lowered by hydraulic assemblies 44 to its lowermost, ground-paralleling position. Machine 20 is then backed toward the stack in order to slip tangs 40 fully beneath the stack as the machine 20 moves rearwardly. Thereupon, the lift 38 may be raised slightly by assemblies 44 if it is desired only to move the stack a short distance from one location to another. In this instance, the lift 38 remains essentially horizontal, although tipped slightly forwardly, and the stack may be lowered back to the ground and the tangs 40 removed quite readily after the new location has been reached.

Assuming however, that the stack is to be disintegrated, the lift 38 is raised well beyond the slightly elevated position previously described toward the intermediate position shown in solid lines in FIG. 1 until the stack becomes fully cradled between structure 48 and lift 38 with its center of gravity essentially directly above the axle 34. In this cradled condition the stack is actually clamped against structure 48 and is partially received between sidewalls 96 of housing 90 such that it is virtually impossible for the stack to escape or accidentally fall apart during subsequent transport.

It is to be noted also that during elevation of the stack toward structure 48, the panel 82 serves as a floor for the stack as the latter slides upwardly along sections 84 and 86 into position for transport and disintegration.

With the stack thus protectively cradled and clamped between structure 48 and lift 38, and with the center of gravity of the stack directly overlying axle 34, the loaded machine 20 is ready for travel over great distances and all kinds of terrain toward the feeding site without risk of losing the stack. Travel over rugged fields, as well as bumpy roads, for substantial distances, presents no problem by virtue of the unique manner in which the stack is cradled within machine 20.

Upon reaching the feeding site the shredding rolls 50, 52 are activated along with auger 74, the machine 20 is advanced, and the lift 38 is raised still further toward rolls 50, 52 such that the stack becomes progressively disintegrated by rolls 50, 52, and the disintegrated material is discharged by auger 74 in a continuous stream onto the ground or into feed bunks or the like. Such action continues as lift 38 is swung toward its fully raised position shown in dotted lines in FIG. 1 such that the stack is progressively force-fed into rolls 50, 52 until it is entirely disintegrated. Note in this respect that the angle of inclination of rolls 50 and 52 is such that their line of centers intersects the lift 38 at axle 34 such that tangs 40 can be brought quite close to the peripheries of rolls 50, 52 in order to completely finish the stack. Moreover, noteworthy is the fact that the arms 88 and tangs 40 of lift 38 are slightly angularly offset with respect to one another such that that portion of lift 38 in the vicinity of crossbeam 42 is rendered essentially complemental to roll 52 as illustrated best in FIG. 1, hence contributing to complete feeding of the stack from lift 38 into rolls 50 and 52.

In addition, since the bank of rolls 50 and 52 is inclined away from a vertical plane intersecting axle 34, the stack inherently tends to fall into the rolls 50 and 52 as its center of gravity passes forwardly beyond axle 34. And, inasmuch as the lift 38 passes a true vertical position before completing the end of its movement against rolls 50 and 52, the last remnant of the stack is being directed downwardly into rolls 50 and 52 by lift 38 rather than upwardly into the same.

Inclination of the bank of rolls 50 and 52 is beneficial not only from the standpoint of receiving the stack from lift 38, but also from the standpoint of properly presenting the disintegrated material to the auger 74. In this respect, note that auger 74 partially underlies the bank of rolls 50 and 52 instead of being disposed completely to one side thereof as would be the case if rolls 50 and 52 were oriented in a truly vertical plane. Hence, the effects of gravity are utilized to a substantial degree as disintegrated foodstuffs leaving the rolls 50 and 52 simply gravitate into trough 78 for lateral conveyance by auger 74.

The disintegrating action provided by rolls 50 and 52 is such that in spite of the stack being force-fed by lift 38 there is little tendency for rolls 50 and 52 to become choked and overloaded with material. In this respect, note that rolls 50 and 52 both rotate counterclockwise viewing FIG. 1 such that their peripheries are moving upwardly across the face of the stack which is being disintegrated. There is no tendency, therefore, for the stack to be drawn into the space between rolls 50 and 52 such as would be the case if the top roll 50 were rotating clockwise and the lower roll 52 were rotating counterclockwise. While some material is directed between rolls 50 and 52 from the stack, a substantial amount is forced up and over the two rolls 50 and 52 between and below the tines 72 of baffles 70. Accordingly, baffle 70 operates to meter the flow of material over the top of roll 50 and, should a large slug or wad of material be thrown up between tangs 40 and roll 50, such slug or wad is penetrated and held by tines 72 somewhat in the nature of a pitchfork until such material can be fully broken apart by the upper roll 50.

The flightings 64 on rolls 50 and 52 are beneficial in that they hold the stack out away from the tubes 58 of rolls 50 and 52 such that the material can be properly engaged by blades 62. Further, they prevent the materials from passing directly through rolls 50 and 52 and also help deflect the stems of the foodstuffs laterally to enable the blades 62 to chop across such stems rather than along the same. Hence, the effect is to provide an improved disintegrating action with little likelihood of clogging and choking the disintegrating structure 48.

Also noteworthy is the fact that by tipping blades 62 of lower roll 52 forwardly in the direction of rotation, the action of roll 52 tends to be more aggressive than that of roll 50 whose blades 62 are tipped back or retarded relative to the direction of rotation. This combination of aggressive action on the part of lower roll 52 and more gentle action on the part of upper roll 50 also contributes significantly to complete disintegration without undue clogging.

After the stack has been fully disintegrated and the foodstuffs have been completely discharged from machine 20, the lift 38 will be fully raised to its dotted-line position shown in FIG. 1 and its solid-line position shown in FIG. 4. In this condition, the lift 38 is tucked neatly within the confines of sidewalls 96 of housing 90 such as to present a compact unit well-suited for over-the-road travel and storage in locations where space may be at a premium. Moreover, little effort is required to retain lift 38 in this position inasmuch as its center of gravity is slightly ahead of axle 34 such that the inherent tendency of lift 38 is to swing forwardly toward structure 48 rather than rearwardly into an extended condition from housing 90.

ALTERNATIVE EMBODIMENT

FIGS. 10, 11 and 12 illustrate an arrangement wherein machine 20 is provided with a second form of metering means in lieu of the tined baffle 70 of the embodiment in FIGS. 1–9. Specifically, a rotor 116 spans housing 90 between sidewalls 96 above rolls 50 and 52 and has its shaft 118 disposed in the same line of centers as shafts 54 and 56 of rolls 50 and 52 respectively. Hence, the inclined bank presented by rolls 50 and 52 is continued by the metering rotor 116.

Rotor 116 has a mounting tube 120 concentrically disposed about shaft 118, and tube 120 is provided with a helically extending series of radially projecting paddles 122. Paddles 122 are bifurcated as illustrated and are not provided with cutting means in contrast to the rolls 50 and 52.

As indicated by the arrow 124 in FIG. 10, rotor 116 is rotated in the opposite direction to rolls 50 and 52 and such rotation is provided by the drive mechanism 126 shown in FIG. 11, which mechanism 126 includes a belt 128 entrained about suitable means (not shown) on shaft 54 of roll 50 and about a large sheave 130. Sheave 130 has a shaft 132 which carries a small driving sprocket 134 engaging a drive chain 136 looped about an idler sprocket 138 and a large sprocket 140 on shaft 118 in a manner to reverse the direction of rotation of shaft 118 relative to shaft 54. A belt tensioner 142 is operated through a cable 144 leading to the towing vehicle such that the operator can periodically engage and disengage rotor 116 without affecting the operation of rolls 50 and 52.

While rotor 116 is of a different construction than baffle 70 and is moving, rather than stationary, during disintegration, its function is the same, i.e., to meter the flow of material traveling upwardly around roll 50. As with baffle 70, rotor 116 prevents slugs or wads of material from passing upwardly over roll 50 without first being disintegrated and, of course, the operator can selectively actuate rotor 116 to the extent required in order to accomplish the desired metering action.

Having thus described the invention, what is claimed as new and desired to be secured by Letters patent is:

1. A farm implement for use in transporting a mass of animal foodstuffs including:
    a mobile frame; and
    a cradle mounted on said frame for transporting the mass during advancement of the frame,
    said cradle including a pair of opposed, upwardly diverging legs,
    one of said legs being fixed against movement relative to the frame and the other of said legs being swingable about a horizontal axis toward and away from a position adjacent said one leg for clamping a mass within the cradle for transport.

2. A farm implement as claimed in claim 1, wherein said one leg includes structure for disintegrating the mass as said other leg swings the mass against said one leg.

3. A farm implement as claimed in claim 2, wherein said frame is provided with means for discharging the disintegrated foodstuffs in a continuous stream as the frame is advanced.

4. A farm implement as claimed in claim 3 wherein said discharging means includes a lateral conveyor.

5. A farm implement as claimed in claim 2, wherein said structure includes a bank of shredding rolls rotatable about axes transverse to the path of swinging movement of said other leg.

6. Apparatus as claimed in claim 5, wherein said other leg includes a series of lifting tangs.

7. A farm implement as claimed in claim 1, wherein said one leg and said other leg comprise the only legs of the cradle, said legs intersecting to form an upwardly opening corner of the cradle.

8. A farm implement as claimed in claim 7, wherein said cradle is provided with a floor spanning said corner above the latter in position to slidingly engage the mass as it is raised toward said one leg by said other leg.

9. A farm implement as claimed in claim 7, wherein said axis of swinging movement of said other leg is located at said corner.

10. Apparatus for handling a mass of animal foodstuffs including:
    a mobile frame having ground-engaging means supporting the frame for advancement over the ground;
    a vertically swingable lift on said frame for raising a mass from the ground into a position for transport; and
    structure on said frame cooperable with said lift for holding the mass substantially centered over said ground-engaging means in said transport position,
    said structure including means for disintegrating the mass as it is swung toward the structure by said lift, said frame being provided with means for discharging the disintegrated foodstuffs in a continuous stream as the frame is advanced.

11. Apparatus for handling a mass of animal foodstuffs including:
    a disintegrator supported above the ground for shredding the mass as it is presented thereto; and
    a swingable lift mounted for continuously pressing the mass against the disintegrator as the mass is progressively raised into the latter by the lift and progressively shredded thereby.

12. Apparatus as claimed in claim 11, wherein the disintegrator and the lift are provided with a mobile frame supporting the same for movement over the ground.

13. Apparatus as claimed in claim 12, wherein said frame is provided with means for discharging the disintegrated foodstuffs in a continuous stream as the frame is advanced.

14. Apparatus as claimed in claim 13, wherein said lift is provided with means for holding the same in any one of a number of selected positions between the ground and the disintegrator for transporting the mass.

15. Apparatus as claimed in claim 11, wherein said disintegrator includes a bank of shredders, said lift being swingable toward and away from an upright position adjacent the bank.

16. Apparatus as claimed in claim 15, wherein said bank includes a pair of superimposed shredders rotatable about axes transverse to the path of swinging movement of the lift.

17. Apparatus as claimed in claim 16, wherein said shredders are disposed to rotate upwardly against the mass during disintegration, and wherein is provided means above the shredders for metering passage of the foodstuffs up and over the shredders.

18. Apparatus as claimed in claim 17, wherein said metering means includes a stationary, tined baffle, said tines projecting downwardly toward said shredders.

19. Apparatus as claimed in claim 17, wherein said metering means includes a paddled rotor rotatable about an axis parallel to those of said shredders and rotatable in a direction opposite to the shredders.

20. Apparatus as claimed in claim 19, wherein said rotor is provided with means for selectively driving the same during continuous rotation of the shredders.

21. Apparatus as claimed in claim 15, wherein said bank of shredders is inclined and the bank and said lift converge toward the axis of swinging movement of the lift.

22. Apparatus as claimed in claim 21, wherein said disintegrator and the lift are provided with a common support frame, said frame having a pair of ground wheels on opposite sides thereof rotatable about an axis in coaxial relationship with the axis of swinging movement of said lift.

23. Apparatus as claimed in claim 21, there being an upwardly arched floor concentric with and spaced above said axis for slidably supporting the mass as it is swung toward the shredders.

24. A method of processing a mass of animal foodstuffs which includes the steps of pressing the mass against disintegrating structure while on the move and while the structure progressively disintegrates the mass, and discharging the disintegrated foodstuffs in a continuous stream as said movement continues.

25. A processing method as claimed in claim 24; and swingably clamping the mass against the structure during transport to a processing site prior to activating the structure.

26. A processing method as claimed in claim 25, wherein the mass is cradled during said clamping and transport.

27. A processing method as claimed in claim 24, wherein said pressing action includes swinging the mass toward the structure.

28. A processing method as claimed in claim 27; and lifting the mass from the ground in the same swinging motion used for clamping and disintegration but prior to such latter steps.

29. A processing method as claimed in claim 28; and slidably supporting the mass from beneath as it is swung toward the disintegrating structure.

* * * * *